United States Patent [19]

Lark

[11] Patent Number: 5,560,278
[45] Date of Patent: Oct. 1, 1996

[54] HYDRAULIC CYLINDER WITH AN ELECTRICAL CONTACTING AND SEALING RING

[75] Inventor: Wayne W. Lark, Joliet, Ill.

[73] Assignee: Caterpillar Inc., Peoria, Ill.

[21] Appl. No.: 321,293

[22] Filed: Oct. 11, 1994

[51] Int. Cl.⁶ .............................. F01B 25/26; F02F 5/00; F16J 9/06
[52] U.S. Cl. .............................. 92/5 R; 277/142; 277/901
[58] Field of Search .................... 92/5 R, 193; 277/142, 277/143, 165, 901; 324/207.22, 207.12, 207.24

[56]  References Cited

U.S. PATENT DOCUMENTS

| | | |
|---|---|---|
| 624,365 | 5/1899 | Mullen . |
| 1,473,446 | 11/1923 | Scott . |
| 1,703,905 | 3/1929 | Solenberger . |
| 2,025,299 | 12/1935 | Mitchell ............................ 277/143 X |
| 2,962,331 | 11/1960 | Folkerts . |
| 3,068,018 | 12/1962 | Tydeman . |
| 3,333,855 | 8/1967 | Andresen ............................ 277/142 X |
| 3,751,047 | 8/1973 | McGee ................................ 277/165 |
| 3,893,675 | 7/1975 | Geffroy ............................. 277/165 X |
| 4,185,842 | 1/1980 | Magara ............................. 277/165 X |
| 4,471,304 | 9/1984 | Wolf ................................ 324/207.24 |
| 4,522,412 | 6/1985 | Kubo . |
| 4,588,953 | 5/1986 | Krage .............................. 324/58.5 |
| 4,737,705 | 4/1988 | Bitar et al. ....................... 324/58.5 |
| 5,107,071 | 4/1992 | Nakagawa ........................ 277/901 X |
| 5,117,066 | 5/1992 | Balsells .......................... 277/901 X |
| 5,139,276 | 8/1992 | Balsells . |
| 5,147,094 | 9/1992 | Rehfeld .......................... 277/165 X |
| 5,182,979 | 2/1993 | Morgan ............................. 92/5 R |
| 5,214,994 | 6/1993 | Engel . |
| 5,222,429 | 6/1993 | Garman et al. ................. 92/5 R X |

FOREIGN PATENT DOCUMENTS

| | | | |
|---|---|---|---|
| 158479 | 6/1952 | Australia ...................... | 277/142 |
| 974917 | 2/1951 | France . | |
| 596000 | 7/1945 | United Kingdom . | |

OTHER PUBLICATIONS

"Electromagnetics", John D. Kraus, McGraw Hill, 1992; Chapter 4–12; pp. 153–155.

Primary Examiner—John E. Ryznic
Attorney, Agent, or Firm—Alvin J. Riddles

[57]  ABSTRACT

A coaxial capacitor contacting and sealing structure, for electrical continuity between parts that move in relation to each other at the ends of a cavity within a hydraulic cylinder employing electromagnetic wave position sensing. The structure employs a contacting and sealing member having a high surface conductivity that is mounted in one of the parts. The mounting of the contacting and sealing member provides force for pressure contact in oil between the parts and to enhance electrical continuity with the part in which the contacting and sealing member is located.

8 Claims, 2 Drawing Sheets

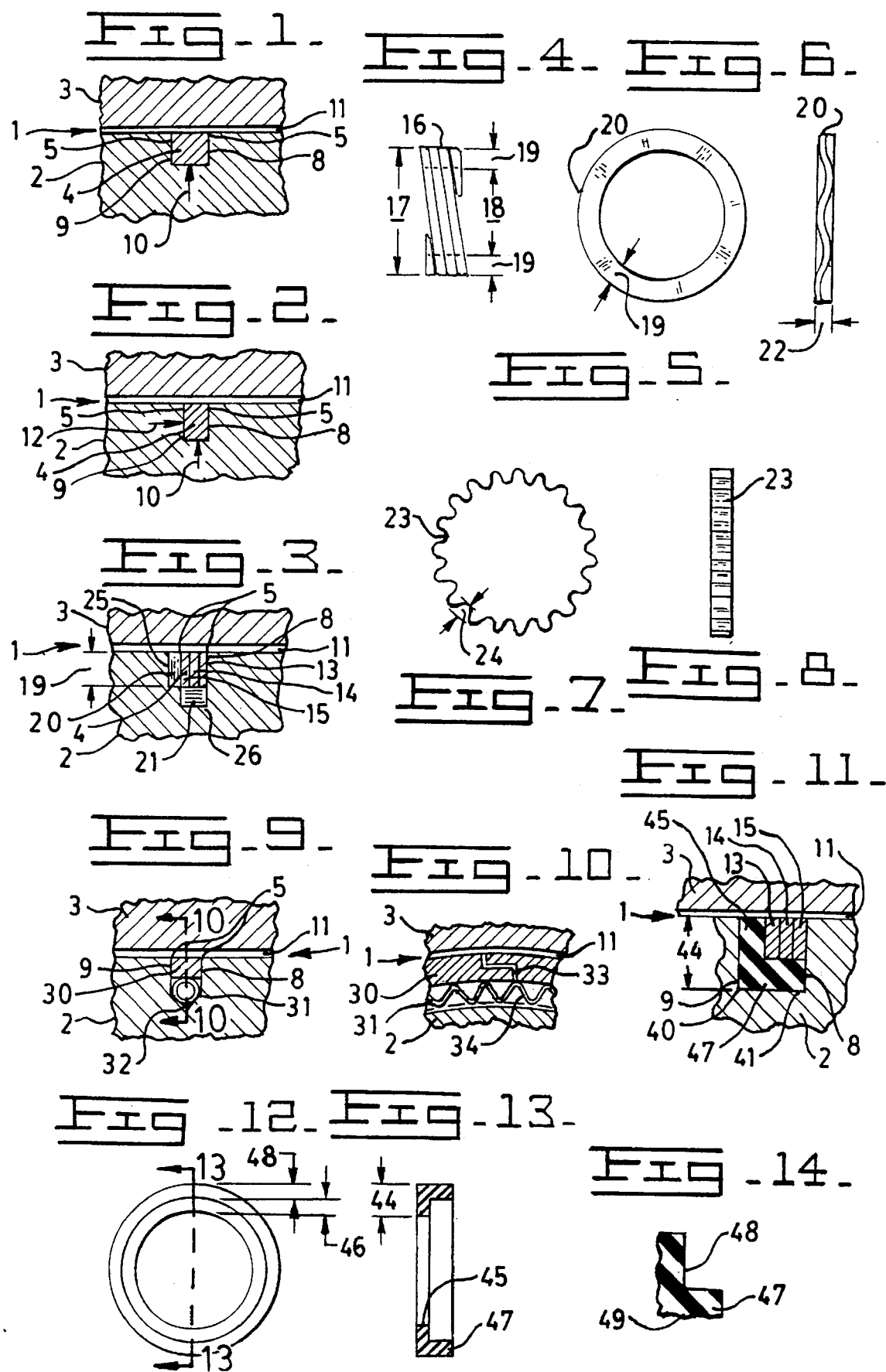

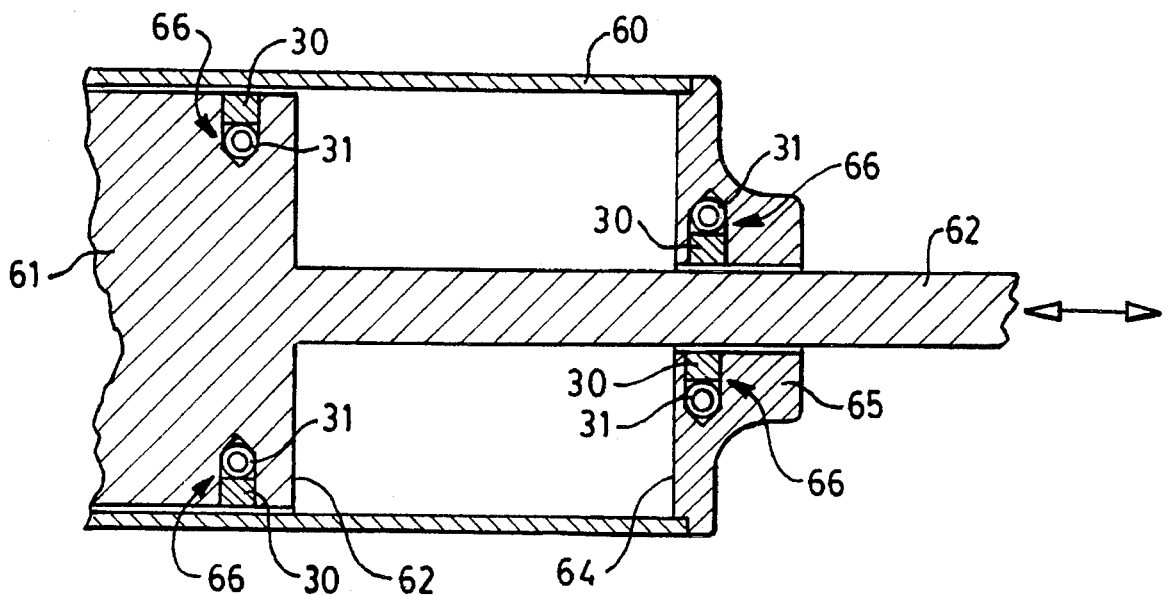
Fig_15_
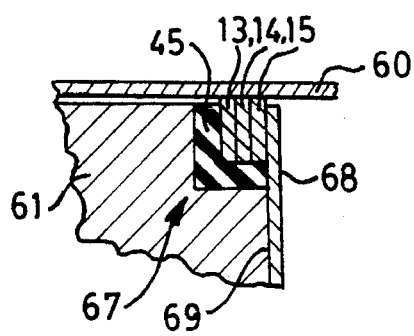
Fig_16_
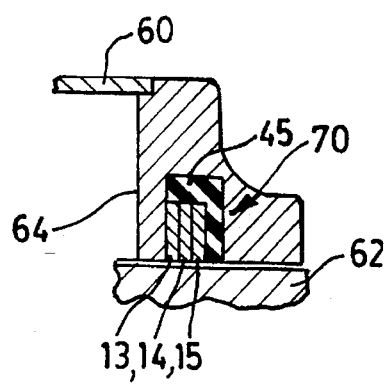
Fig_17_

HYDRAULIC CYLINDER WITH AN ELECTRICAL CONTACTING AND SEALING RING

TECHNICAL FIELD

The invention relates to the sensing of the position of a piston and rod combination in a hydraulic cylinder using electromagnetic waves in the hydraulic fluid in the cylinder and in particular to the electrical contacting and the prevention of leakage of the electromagnetic waves at the interfaces between moveable parts.

BACKGROUND ART

Hydraulic cylinder and piston combinations are being increasingly used in fields that involve the moving and positioning of material and objects. As the various applications of hydraulic cylinder and piston combinations have progressed, more stringent operational criteria are being encountered, and a need has developed to precisely, reliably and continuously sense the position of the piston and it's related displacement parameters, velocity and acceleration.

A promising approach developing in the art employs the use of electromagnetic waves in the hydraulic fluid in the cylinder in determining the position of the piston. In one aspect of this approach, the wave performance in the fluid in the cylinder is comparable to wave performance in a transmission line with shorted ends in that the resonance frequency of an electromagnetic standing wave correlates with the transmission line length which is the length of the cavity of the interior of the cylinder between the end and the piston as shorted ends.

One application of the use of electromagnetic waves for piston position sensing is shown in U.S. Pat. No. 4,588,953 wherein the frequency, of electromagnetic waves introduced into the cylinder between the closed end of the cylinder and the piston, is swept between two limits with the number of detected resonant peaks being indicative of the piston position.

In U.S. Pat. No. 4,737,705 improvement is achieved by providing a coaxial resonant cavity, that is a cavity with a central core member, and in which the electromagnetic waves are launched and propagated in the mode referred to as the transverse electromagnetic wave (TEM) mode. The cylinder on the rod side of the piston is one type of coaxial cavity.

In U.S. Pat. No. 5,182,979, further improvement is made by detecting the resonance frequency values in signal processing sections for transmitting and receiving, the receiving one of which compensates for differences in insertion losses as the linear extension of the piston and rod in the cylinder takes place.

As progress in the art is developing greater precision is being sought in resonant frequency detection. It is becoming of importance to improve the short circuit aspect of the piston and the end of the cylinder as ends of a transmission line and to prevent leakage of the electromagnetic waves from the cylinder.

In U.S. Pat. No. 5,222,429 the problem of electromagnetic wave leakage from the cylinder is recognized and a sealing structure, made up of a split ring over an expansion member positioned in a groove of the piston, is described.

DISCLOSURE OF THE INVENTION

In a hydraulic cylinder electromagnetic wave piston position sensing system, a structural principle is provided that enables both "static" and "in motion" electrical continuity to be achieved across an intersection between parts that are in a moveable relationship to each other. The structural principle achieves the formation of a coaxial capacitor by arrangement of the parts and the dielectric properties of the hydraulic fluid of the cylinder at the electromagnetic wave frequencies which provides an alternating current coupling across the intersection.

At the intersection, a metal contacting and sealing member, of a material with a high surface conductivity, is located in one part, positioned across the intersection from the other part, and separated by an oil film. The contacting and sealing member is retained in position in a groove in one part. A force is provided perpendicular to the intersection urging the contact and sealing member into pressure contact with the part on the other side of the intersection. Provision is made for the contact and sealing member to have electrical continuity with the part in which it is retained.

BRIEF DESCRIPTION OF THE DRAWINGS

FIG. 1 is a schematic cross sectional illustration of the oil film contact interface between the parts that move with relation to each other and the elements employed.

FIG. 2 is a schematic cross sectional illustration of an embodiment employing two forces.

FIG. 3 is a schematic cross sectional illustration of the use of a spirally cut material as the contacting and sealing member of the embodiment of FIG. 2.

FIG. 4 is an illustration of a spirally cut material member.

FIGS. 5–8 are top and side views of wave spacer type, force providing, members.

FIG. 9 is a schematic cross sectional illustration of a single force embodiment of the oil film contact of the invention employing a split ring and canted coil.

FIG. 10 is a side view of the split ring and canted coil assembly.

FIG. 11 is an assembly schematic illustration of the embodiment of FIG. 2 employing as wave spacer type force providing members an elastomeric member.

FIGS. 12–14 are top, side and cross sectional views respectively of an elastomeric force providing member employed in the embodiment illustrated in FIG. 11.

FIG. 15 is a schematic cross sectional illustration of the embodiment of FIGS. 9 and 10 of the invention in both the head surrounding the rod and the piston in a hydraulic cylinder.

FIG. 16 is a schematic cross sectional depiction of the assembly of the embodiment of FIG. 11 of the invention at the face of the piston in a hydraulic cylinder.

FIG. 17 is a schematic cross sectional depiction of the assembly of the embodiment of FIG. 11 of the invention in the head surrounding the rod in a hydraulic cylinder.

DESCRIPTION OF THE INVENTION

In electromagnetic sensing of the position of the piston and rod combination in a hydraulic cylinder, the cylinder serves as an electromagnetic wave cavity and in the presence of a band of frequencies, which may for example be from 50 mega hertz (MHz) to 1.6 giga hertz (GHz), a standing electromagnetic wave is set up in the hydraulic fluid with the position of the piston being determined by frequency resonances that are directly related to the length of the cavity which is the distance from the end of the cylinder to the piston.

In an electrical sense, the cavity may be considered to be a transmission line with shorted ends. However, in the case of a piston and rod in a hydraulic cylinder, the "end" that is to be a short circuit, or ideally have no impedance, includes an intersection between mechanical parts that may move with respect to each other. Any electrical discontinuity at that intersection, either under static or "in motion" conditions results in noise that can affect the ability to precisely determine resonance frequencies and any leakage deteriorates the wave conditions in the cavity.

In accordance with the invention the structural principles of an interface for both "static" and "in motion" electrical contacting across an intersection between parts that may move with respect to each other is achieved by the use of both the D.C. performance of the parts and the surface current characteristics of current flow at the higher frequencies for A.C. coupling.

Referring to FIG. 1 a cross sectional illustration is provided of the oil film contacting interface of the invention between the parts that move with relation to each other. In FIG. 1, at an intersection 1 between a first part 2 and a second part 3, the parts 2 and 3 are moveable with respect to each other. The intersection 1 is a portion of a cylindrical surface. A contacting and sealing member, that is circular with dimensions compatible with the cylindrical surface of the intersection is positioned at a location in the part 2, in a groove 5. The part 2 provides, supporting and electrical continuity providing, faces 8 and 9 in contact with the member 4. The member 4 is urged into contact with the part 3 by a force 10 shown as an arrow. The contacting and sealing member 4 is made of high surface conductivity material that is relatively the same hardness as the metal of the parts 2 and 3, for example of beryllium copper in relation to the parts 2 and 3 which for example may be of cast iron or steel.

In FIG. 1, a film of oil 11, is present in the interface including the portion between the contacting and sealing member 4, and the part 3. The hydraulic fluid in the cylinder for producing piston motion also serves as the lubricant between the parts at the intersection 1 and provides the oil film 11. In accordance with the invention, at electromagnetic wave frequencies such as for example 50 mega hertz (MHz) to 1.6 giga hertz (GHz), the film of hydraulic fluid oil 11 provides alternating current coupling through control of appropriate parameters which impart the required characteristics for coaxial capacitive coupling.

The capacitive properties of a coaxial transmission line are known in the art and are discussed, for example, in the text book "Electromagnetics" by J. D. Kraus, Fourth Edition, McGraw-Hill, 1992 in Chapter 4–12.

The capacitance of the coaxial capacitor contacting and sealing member of the invention follows the relationship expressed in equation 1.

Equation 1:

$$c = \frac{2\pi\epsilon L}{\ln\left(\frac{D}{d}\right)} \text{ Farads}$$

Where "$\epsilon$" is the permittivity of the oil film 11, which in turn is the product of the permittivity of free space and the relative permittivity for oil ($\epsilon_o \times \epsilon_r$).

$L$ is the length of the capacitor, which is the dimension across the face of the element 4 in contact with the oil film 11 in FIG. 2 and, $\frac{D}{d}$ is the ratio of the diameters, where $D$ is the inside diameter of part 3 and $d$ is the outside diameter of element 4

The oil film thickness should be uniform. The member 4 should have a compliant relationship such that it is pressed sufficiently by force 10 but will flex if minor imperfections in the surface of part 3 are encountered. The separation of the member 4 and the part 3 across the oil film 11 provides greatly extended wear life and eliminates the contact noise normally present in sliding metal contacts.

As an illustration in applying the principles of the invention consider the following example. A desired, about 10 nanofarad capacitance would provide a satisfactory AC coupling across a piston to cylinder intersection and a rod to head intersection at a frequency of about 62 MHz.

The required 10 nanofarad capacitance was determined by trial and error capacitance value substitutions into a computer model of the bounded cavity. The modelling software is the Hewlett Packard Microwave Design System, standard in the art.

An assumption is made of a piston diameter of 150 mm, a rod diameter of 105 mm and an oil film 11 thickness of 0.00254 mm. Standard, off the shelf, spiral cut members, as shown in FIG. 4 are selected with different numbers of turns of the spiral to provide a length in millimeters along the intersection 1 of the face of the element 4 of FIG. 1 of 2.54 mm for the piston—cylinder intersection and 2.286 mm for the rod—head intersection. The capacitance of each intersection is calculated in accordance with Equation 1 above.

Equation 2:

$$C(\text{Piston-Cylinder}) = \frac{2\pi\epsilon_o\epsilon_r L}{\ln\left(\frac{D}{d}\right)} =$$

$$\frac{2\pi(8.85 \times 10^{-12})(2.2)(2.54 \times 10^{-3})}{\ln\left(\frac{150}{150 - 0.00254}\right)} = 18.35 \times 10^{-9} \text{ Farads}$$

Equation 3:

$$C(\text{Rod-Head}) = \frac{2\pi\epsilon_o\epsilon_r L}{\ln\left(\frac{D}{d}\right)} =$$

$$\frac{2\pi(8.85 \times 10^{-12})(2.2)(2.286 \times 10^{-3})}{\ln\left(\frac{105 + .00254}{105}\right)} = 11.55 \times 10^{-9} \text{ Farads}$$

The Capacitance Value of the two intersections is the series combination of the values of equations 2 and 3 which is about $7 \times 10^{-9}$ Farads, a sufficiently close value to the desired value, to indicate satisfactory AC coupling.

The electrical contact between the member 4 and the part 2 may be achieved by making the clearance with the faces 8 and 9 close, by applying a force parallel to the intersection 1 that urges element 4 towards face 8 or 9 and by imparting conductivity into the force 10.

The oil film contact of the invention can be constructed in one type of embodiment by providing separate orthogonal forces on the member 4; one force being applied to the member 4 parallel to the intersection 1 for the purpose of insuring contact with a face 8 or 9 of the groove 5 and thereby to insure electrical contact with the part 2; and the other force being applied to the member 4 perpendicular to the intersection 1 to provide a contacting pressure on the member 4 to insure contact through the oil film 11 with the part 3.

The two orthogonal force type of embodiment is illustrated in FIG. 2 using where appropriate the reference numbers of FIG. 1. Referring to FIG. 2. At the intersection 1, where the first 2 and the second part 3 are moveable with respect to each other, the contacting and sealing member 4 is positioned in the groove 5. A force 12, depicted by an arrow is applied to the member 4 in a direction parallel to the intersection 1 to enhance electrical contact with the opposite face 8 or 9 of the groove 5 depending on the direction of the force 12. In the illustration of FIG. 2 the force 12 is applied to the member 4 in the direction toward the face 8 of the groove 5. The force 10 is applied perpendicular to the intersection 1, to insure contact of the element 4 across the intersection 1 through the oil film 11 to the part 3.

Referring next to FIGS. 3 through 8 in which there is illustrated the assembly and parts for the use of a spirally cut material to provide the functions of the contacting and sealing member 4; and the use of wave spacer type springs for the forces 10 and 12.

In FIG. 3 using the same reference numerals where appropriate, the assembly of the oil film electrical contact of the invention is shown. In FIG. 3 the contacting and sealing member 4 is made up in cross section of a plurality of lamination submembers occupying the width of the member 4, and of which an example three, 13, 14 and 15, are shown. In FIG. 4 the spirally cut material is illustrated as element 16. The material is a high conductivity surface hardness material such as Beryllium Copper cut in a spiral about 3 millimeters thick and having a selected outside diameter 17, inside diameter 18 and web dimension 19. In FIG. 3, in the case of the intersection 1 being between the piston as part 2 and the cylinder wall as part 3 the outside diameter would be at the oil film 11 in the intersection 1 and the dimension 19 would be the length of the submembers 13, 14, and 15 in the groove 5. In the case of the intersection 1 being between the head as part 2 and the rod as part 3 the inside diameter would be at the oil film 11 in the intersection 1, the dimension 19 would still be the length of the submembers 13, 14, and 15 in the groove 5.

Continuing to refer to FIG. 3, the force 12 shown in FIG. 2 is provided by a side wave spacer spring 20 that forces the contacting and sealing elements 13,14 and 15 against the face 8 of the groove insuring thereby electrical contact to the part 2. Similarly the force 10 shown in FIGS. 1 and 2 is provided by a compression wave spacer spring 21 that forces the contacting and sealing elements in the direction of part 3 across the oil film 11 in the intersection 1. Both wave spacer springs 20 and 21 also contribute in insuring electrical contact of the contacting and sealing elements with part 2.

In FIGS. 5 and 6, top and side views respectively, are shown of the side type wave spacer spring 20. The side type wave spacer 20 may be made of spring steel and is circular to fit the periphery of a piston with a dimension of the order of dimension 19 between the inside and outside diameters. The displacement 22 of the wave in the element 20 provides the effect of force 12 on element 4 made up of subelements 13, 14 and 15. In FIGS. 7 and 8, top and side views respectively, are shown of a compression type wave spacer spring 23. The material of element 23 is spring steel. The individual compression increments 24, when positioned under the member 4, made up of subelements 13, 14 and 15 provides the effect of the effect of force 10 of FIGS. 1 and 2.

In the assembly of FIG. 3 the groove 5 is cut out of part 2, one side of the groove being the face 8, the other side being face 25 and the bottom of the portion under element 4 being face 26. Within the groove 5, the member 20 is positioned between the member 4, made up of subelements 13, 14 and 15, and the face 25 so that the member 4 is forced against the face 8 by the displacement 22 of the waves of element 20 serving as the force 12. The compression increments 24 of the member 23 positioned between the bottom face 26 and the member 4, made up of subelements 13,14 and 15, urges the member 4 into contact with the part across the oil film 11 providing the force 10 of FIGS. 1 and 2.

In FIGS. 9 and 10 there is illustrated a single force embodiment of the oil film contact of the invention, both employing the same reference numerals as in other figures where appropriate. In FIG. 9 a cross sectional view of the parts at the intersection is provided with FIG. 10 showing a side view along the line 10—10.

Referring to FIG. 9, in part 2 the groove 5 between the faces 8 and 9 as shown in FIG. 1 is a sliding fit for the width of the element 30 which performs the contacting and sealing function of element 4 of FIG. 1. The element 30 is a split ring about 10 millimeters wide of a material such as beryllium copper. The element 30 is urged into contact with the part 3 across the oil film 11 in the intersection 1 by a canted coil spring 31. The canted coil spring 31 performs the function of force 10 illustrated in FIG. 1 and also provides electrical contact to part 2. The groove 5 has a bottom portion 32 with an essentially V shape to limit side motion of the canted coil spring 31. As the parts 2 and 3 move relative to each other the element 30 is pressed against the one groove face 8 or 9 enhancing contact with part 2.

Referring to FIG. 10, a side view of a portion of the split ring element 30 and the canted coil spring element 31 along the line 10—10 of FIG. 9 is shown. The split 33 in the element 30 permits the element 30 to expand under the force of the canted coils 34. The canted coil spring 31 serves as the force 10 of FIG. 1 with a steady contact pressure to the contacting and sealing element 30 and provides electrical contact through a number of electrical contact points to the part 2. The canted coil spring 31 further provides a garter type function in that it is a complete circle with a length that permits it to retain itself in the groove 5. The garter capability is useful in assembly. The canted coil spring 31 is a commercial product, one manufacturer being the Balseal Corp. of Santa Ana, Calif. A coil diameter of 3 millimeters with a wire diameter of 0.010 to 0.014 in. of stainless steel or beryllium copper is satisfactory.

In FIGS. 11–14 an elastomeric member is employed to provide both forces 10 and 12 illustrated in FIG. 2. An assembly schematic is shown in FIG. 11. A plan view of the elastomeric member is shown in FIG. 12 with a sectional view in FIG. 13 along the line 13—13 of FIG. 12. A portion of the elastomeric member to a larger scale showing deformation accommodation is shown in FIG. 14.

Referring to FIG. 11, wherein the same reference numerals are used where appropriate the function of the contacting and sealing member 4 is provided by the spirally cut material 16 of FIG. 4 of which three laminations 13, 14 and 15 are shown in the cross section. The functions of the forces 10 and 12 illustrated in FIG. 2 are provided by elastomeric element 40. The element 40 is positioned in a groove 41 having faces 42 and 43 with sufficient width between them to accommodate the contacting and sealing subelements 13, 14 and 15 and the portion of the element 40. The depth dimension 44 of the groove accommodates the vertical dimension of the element 40. When in position the elastomeric material of the element 40 is under compression.

In FIGS. 12 and 13 the elastomeric member 40 is circular, of the order of the periphery of the piston or the rod and made of "Buna N" rubber. The shape is as depicted in FIGS. 13 and 14 with the portion 45 performing the function of the force 9 of FIGS. 1 and 2 and the portion 47 with the corresponding dimension 48 performing the function of the force 10 of FIGS. 1 and 2. In the FIG. 14 the member 40 is provided with displacement accommodating regions 49 to facilitate deformation in compression.

In service, in a hydraulic cylinder, continuity can be disrupted and the electromagnetic energy can leak out at the intersection of the piston and the cylinder wall and in cylinders where the rod side of the piston is used as a coaxial type of cavity continuity disruption and leakage can also occur at the intersection of the rod and the head the rod goes through. The two intersections are of the type illustrated in FIG. 1 and are illustrated together in cross section in FIG. 15.

Referring to FIG. 15, in a cylinder 60, a piston 61 with attached rod 62, moves in either direction, as depicted by the double headed arrow, under the influence of fluid pressure against the piston 61. The cavities, only one of which is shown, formed by the piston, the ends of the cylinder and the cylinder wall, are useable for electromagnetic wave piston position determination. In the determination, resonance frequencies are directly related to the length of a transmission line cavity with shorted ends where in the hydraulic cylinder the piston and the head are the ends to be shorted.

It will be apparent that the performance of the position determination system will be directly related to the quality of the electrical continuity in the shorting over the ends. One end being the face 63 of the piston 61 and the other being the face 64 of the head 65. The intersections between the cylinder 60 wall and the piston 61 around the circumference of the piston 61 is one region of potential electrical discontinuity and leakage and the intersection between the head 65 and the rod 62 around the circumference of the rod 62 is a second region of potential electrical discontinuity and leakage.

The intersections that form the regions of potential electrical discontinuity and leakage are in different parts of the overall structure and present different problems in assembly that influence procedures and selection of parts. At the interface of FIG. 1, in the case of the piston 61—cylinder 60 wall intersection, the piston 61, the moving member, corresponds to part 2 of FIG. 1. In the case of the rod 62—head 65 intersection, the head 65, the stationary member corresponds to part 2 of FIG. 1. In FIG. 15 the contacting and sealing element 66 of the invention is the split ring 30 and canted coil 31 embodiment described in connection with FIGS. 9 and 10. Element 66 is employed on the piston 61 and in the head 65.

In the practice of the invention, in assembly, where the face 8 of part 2 of the interface of FIG. 1 is accessible, the face 8 can be provided by a separate part which can be removable and which in turn gives flexibility in the parts and their assembly. The situation could apply to both the piston and the head.

The situation is illustrated in connection with FIG. 16 which is a schematic cross sectional depiction of the invention assembled at the face 63 of the piston 61.

Referring to FIG. 16, at the intersection of the piston 61 with the cylinder 60, the piston 61 has a portion 67 cut out to accommodate the assembly of the contacting and sealing submembers 13,14 and 15 with an elastomeric force providing member 45. A removable plate 68 on the face 69 of the piston 61, attached by flush screws, not shown, serves as the face 8 of FIG. 1 retaining the assembly in position and providing electrical continuity. It should be noted that one effect of the plate 68 is that it's thickness dimension reduces the length of the cavity and if the dimension difference is significant, it should be taken into consideration in the computations involved in position determination.

In FIG. 17, there is shown the situation in the assembly of the invention in a groove 70 where accessibility through an adjacent face is not achievable. The force providing member, shown as an illustration as elastomeric member 45 although alternatively it could be the canted coil spring, is fed into the groove 70, followed by the contacting and sealing element 4 which may as an illustration be the portions 13,14 and 15 of spirally cut metal or alternatively the split ring, before the rod 62 is assembled in the head 65.

It should be noted that the purpose of the contacting and sealing interface of the invention is electrical continuity rather than oil containment. In hydraulic systems there are much heavier oil leakage control mechanisms, not shown. In the event that oil pressure differences along the intersection in the interface are of concern, oil pressure relief holes, not shown, can be positioned transversely through the contacting and sealing element 4 without detriment to the electrical continuity.

What has been described is an electrical contacting and sealing interface that provides improved continuity in shorting the ends of the cavity within a hydraulic cylinder employing electromagnetic wave piston position sensing.

Other aspects of the invention can be obtained from the study of the drawings, this disclosure and the appended claims.

I claim:

1. In a hydraulic cylinder electromagnetic wave piston position sensing system, the improvement comprising:

an electrical contacting interface between first and second metal parts in contact in movable relationship at and along an oil bearing intersection, said interface including a third part, said third part being of a material with a high surface conductivity, said third part having a spiral shape and being located in a portion of said first metal part, said interface including force means applied to said third part by at least one member taken from the group of wave spring members, canted coil spring members and elastomeric members, and operable to provide pressure on said third part in a direction parallel to said intersection and pressure on said third part in a direction perpendicular to said intersection.

2. The improvement of claim 1 wherein said third part is of beryllium copper.

3. In a hydraulic cylinder electromagnetic wave piston position sensing system, the improvement comprising:

an electrical contacting interface between first and second metal parts in contact in movable relationship at and along an oil bearing intersection, said interface including a third part, said third part being of beryllium copper, said third part having a split ring shape and being located in a portion of said first metal part, said interface including force means applied to said third part by at least one member taken from the group of wave spring members, canted coil spring members and elastomeric members, and operable and wherein pressure is applied on said split ring in the direction of said second metal part by a canted coil spring.

4. A hydraulic cylinder electromagnetic wave piston and rod position sensing system wherein, in an electromagnetic wave cavity in the cylinder between the piston as one end and the end of the cylinder as the other end, a cavity termination structure for an end that includes a stationary and a movable member comprising:

an oil bearing intersection between first and second contacting metal parts in movable relationship, a third part, said third part being located at the face of said piston, as first metal part and being retained by a plate on the surface of said piston, said third part being of a material having a high surface conductivity, and, force means provided by at least one member of the group of wave springs, canted coil springs and compressed elastomers and adapted to enhance electrical continuity between said first metal part and said third part, and, pressure to move said third part in the direction of said second metal part.

5. A hydraulic cylinder electromagnetic wave piston and rod position sensing system wherein, in an electromagnetic wave cavity in the cylinder between the piston as one end and the end of the cylinder as the other end, a cavity termination structure for an end that includes a stationary and a movable member comprising:

an oil bearing intersection between first and second contacting metal parts in movable relationship, a third part, said third part being located in a groove in a member taken from the group of the piston and the head, said third part being of beryllium copper in a spiral shape, said third part being located in a portion of said first metal part, force means provided by at least one member of the group of wave springs, canted coil springs and compressed elastomers and adapted to enhance electrical continuity between said first metal part and said third part, and, to move said third part in the direction of said second metal part.

6. A hydraulic cylinder electromagnetic wave piston and rod position sensing system wherein, in an electromagnetic wave cavity in the cylinder between the piston as one end and the end of the cylinder as the other end, a cavity termination structure for an end that includes a stationary and a movable member comprising:

an oil bearing intersection between first and second contacting metal parts in movable relationship, a third part, said third part being located in a groove located in a member taken from the group of the piston and the head, said third part being a beryllium copper split ring, said third part being located in a portion of said first metal part, force means provided by at least one member of the group of wave springs, canted coil springs and compressed elastomers and adapted to enhance electrical continuity between said first metal part and said third part, and, to move said third part in the direction of said second metal part.

7. In a hydraulic cylinder electromagnetic wave piston position sensing system, the improvement comprising:

an electrical contacting interface between first and second metal parts in contact in movable relationship at and along an oil bearing intersection, said interface including a third part, said third part being of a material with a high surface conductivity, said third part being located in a portion of said first metal member, said interface including first force means operable to provide electrical continuity between said first metal member and said third part, and, said interface providing second force means operable to apply pressure to said third part member in contact with said second metal member in said oil bearing intersection.

8. The improvement of claim 7 wherein said first and second force means are provided by a canted coil spring.

* * * * *